United States Patent [19]

Nakazeki et al.

[11] Patent Number: 4,686,404

[45] Date of Patent: Aug. 11, 1987

[54] CONTROLLED RADIAL MAGNETIC BEARING DEVICE

[75] Inventors: Tsugito Nakazeki; Shoji Nanami, both of Iwata; Koichi Okada, Toyooka, all of Japan

[73] Assignee: NTN Toyo Bearing Co., Ltd., Osaka, Japan

[21] Appl. No.: 824,697

[22] PCT Filed: Apr. 2, 1985

[86] PCT No.: PCT/JP85/00158
§ 371 Date: Jan. 10, 1986
§ 102(e) Date: Jan. 10, 1986

[87] PCT Pub. No.: WO85/05417
PCT Pub. Date: Dec. 5, 1985

[30] Foreign Application Priority Data

May 18, 1984 [JP] Japan .................................. 59-101506

[51] Int. Cl.⁴ ............................................. F16C 39/06
[52] U.S. Cl. ................................. 310/90.5; 74/5.6 D; 318/629
[58] Field of Search ....................... 310/90.5; 74/5.6 D; 318/460, 629, 632, 661

[56] References Cited

U.S. PATENT DOCUMENTS

| 3,787,100 | 1/1974 | Habermann | 310/90.5 |
| 4,121,143 | 10/1978 | Habermann | 310/90.5 |
| 4,417,772 | 11/1983 | Robinson | 310/90.5 |
| 4,473,259 | 9/1984 | Goldowsky | 310/90.5 |

FOREIGN PATENT DOCUMENTS

| 0081217 | 5/1983 | Japan | 310/90.5 |
| 2109596 | 11/1982 | United Kingdom | 310/90.5 |

Primary Examiner—R. Skudy
Attorney, Agent, or Firm—Wenderoth, Lind & Ponack

[57] ABSTRACT

A controlled radial magnetic bearing device which has an X-axis electromagnet and a Y-axis electromagnet provided on the X-axis and Y-axis perpendicular to each other in a plane normal to the axis of a rotary shaft, X-axis and Y-axis position sensors for detecting any displacement of the rotary shaft from its reference position, and X-axis and Y-axis control circuits for feeding the outputs of said position sensors back to the electromagnets to control them. It further includes a speed detector for detecting the speed of the rotary shaft, and an X-axis correction circuit for having a band-pass filter for extracting a reverse precession frequency component from the output of the Y-axis position sensor, a circuit for changing the output of the filter according to the output of the speed detector and an adder for adding the output of the changing circuit to the output of the X-axis position sensor, the output leading in phase by 90 degrees with respect to the reverse precession frequency component, and a Y-axis correction circuit having substantially the same structure as the X-axis correction circuit for and having a circuit for reversing the phase of the output of the X-axis position sensor, thereby attenuating the outputs of the X-axis and Y-axis control circuits with respect to the reverse precession frequency component and effectively attenuating the precession of the rotary shaft.

6 Claims, 3 Drawing Figures

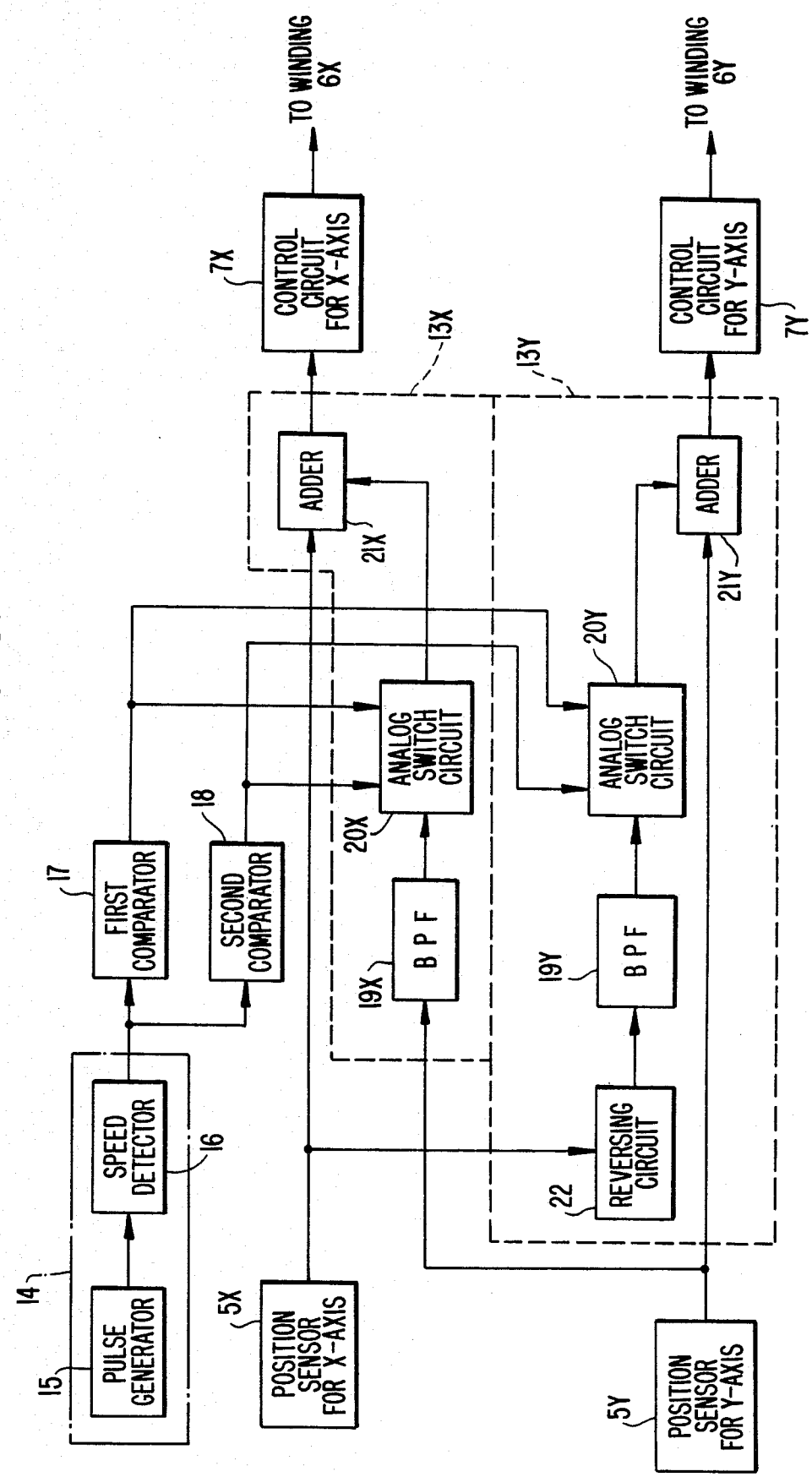

4,686,404

CONTROLLED RADIAL MAGNETIC BEARING DEVICE

BACKGROUND OF THE INVENTION

The present invention relates to a magnetic bearing device, and particularly to a controlled radial magnetic bearing device.

Magnetic bearings of a controlled type have recently been used for spindles of machine tools, turbo-molecular pumps, etc. which are driven at a high speed e.g. 30,000–40,000 r.p.m. or higher. As one of such magnetic bearings, a controlled radial magnetic bearing is known.

The bearing of this type generally includes an electromagnet for the X-axis and an electromagnet for the Y-axis provided in X- and Y-axis directions perpendicular to each other in a plane normal to the axis of the rotary shaft to magnetically support the rotary shaft; position sensors for X-axis and Y-axis are disposed on the X-axis and Y-axis, respectively, to detect any displacement of the rotary shaft in the X-axis and Y-axis directions from a reference position, and control circuits are provided for the X-axis and Y-axis for feeding the outputs of the position sensors back to the electromagnets and thereby controlling the outputs of the electromagnets.

With such a magnetic bearing device, the electromagnetic forces of the electromagnets for the X-axis and Y-axis are controlled by detecting any displacement of the rotary shaft in the X-axis and Y-axis directions by means of the position sensors, and then amplifying any differences from reference values preset in the control circuits, and then phase-compensating them, and then amplifying the outputs.

In case such a conventional controlled magnetic bearing device is used with a spindle of a turbo-molecular pump, for example, a fin rotor mounted on the spindle increases the inertia moment, so that as the speed of rotation increases, the gyroscopic moment sometimes generates a reverse precession in a direction reverse to the rotation of the spindle (as shown in FIG. 2).

Such a precession can be restrained by increasing the gain of the control system and the dynamic rigidity. However, the increase of gain has a disadvantage of requiring a higher voltage for control and causing increased vibration during rotation.

SUMMARY OF THE INVENTION

An object of the present is to provide a controlled radial magnetic bearing device which can effectively suppress the precession of a rotary shaft without increasing the gain of the control system or dynamic rigidity.

Another object of the present invention is to provide a magnetic bearing device which has a control circuit for controlling the position of the axis of a rotary shaft, the control circuit comprising correction circuits for adjusting the outputs of the position sensors for the X-axis and Y-axis so that one of the outputs will lead in phase by 90 degrees with respect to the other output, thereby attenuating the precession of the rotary shaft electrically.

In accordance with the present invention, there is provided a controlled radial magnetic bearing device having an electromagnet for the X-axis and an electromagnet for the Y-axis provided on the X-axis and Y-axis perpendicular to each other in a plane normal to the axis of a rotary shaft for magnetically supporting the rotary shaft, position sensors for the X-axis and Y-axis provided on the X-axis and Y-axis for detecting any displacement of the rotary shaft from its reference position in the X-axis and Y-axis directions, respectively, and control circuits for the X-axis and Y-axis for feeding the outputs of said position sensors back to said electromagnets and thereby controlling the outputs of said electromagnets, characterised in that it further comprises a speed detecting means for each of said control circuits for detecting the speed of rotation of the rotary shaft, a correction circuit for the X-axis comprising a band-pass filter for taking extracting the frequency component of the reverse precession from the output of the position sensor for of phase by 90 degrees, to control the position of the rotary shaft in the X-axis direction, a changing means for changing the output of said band-pass filter according to the output of said speed detecting means and an adder means for adding the output of said changing means to the output of said position sensor for the X-axis so as to generate an output leading in phase by 90 degrees from the frequency output of the reverse precession, said correction circuit for the X-axis supplying its output to said control circuit for the X-axis, and a correction circuit for the Y-axis having substantially the same structure as said correction circuit for the X-axis and adapted to advance the phase of the output of said position sensor for the X-axis by 90 degrees with respect to the output of said position sensor for the Y-axis.

With the above-mentioned controlled radial magnetic bearing device, when the rotary shaft starts precession at a very low frequency, say, a few hertz, the components representative of eccentric rotational movement at a low frequency, that is, precession are detected by the position sensors and the correction circuits for the X-axis and Y-axis (which may be replaced with low-pass filters), part of the output of the sensor at the side leading in phase is added to the output of the sensor at the side lagging in phase which is not passed through a filter circuit, and the output of the sensor at the side lagging in phase is phase-reversed to advance the phase by 90 degrees and part of the output is added to the output of the sensor at the side leading in phase which is not passed through a filter circuit. In other words, the values detected by the position sensors are converted to corrected detected values advanced in terms of a vector with respect to the frequency component of precession, and the corrected detected values are fed back to the control circuits.

Part of the output of one sensor to be added to the output of the other sensor is regulated according to the speed of rotation of the rotary shaft. This is because the higher the speed of rotation, the larger the gyroscopic effect.

Other features, objects and advantages of the present invention will become apparent from the following description about the preferred embodiment taken with reference to the accompanying drawings.

BRIEF DESCRIPTION OF THE DRAWINGS

FIG. 3 is a detailed block diagram showing an embodiment of the present invention.

DESCRIPTION OF THE PREFERRED EMBODIMENT

Figure 1:
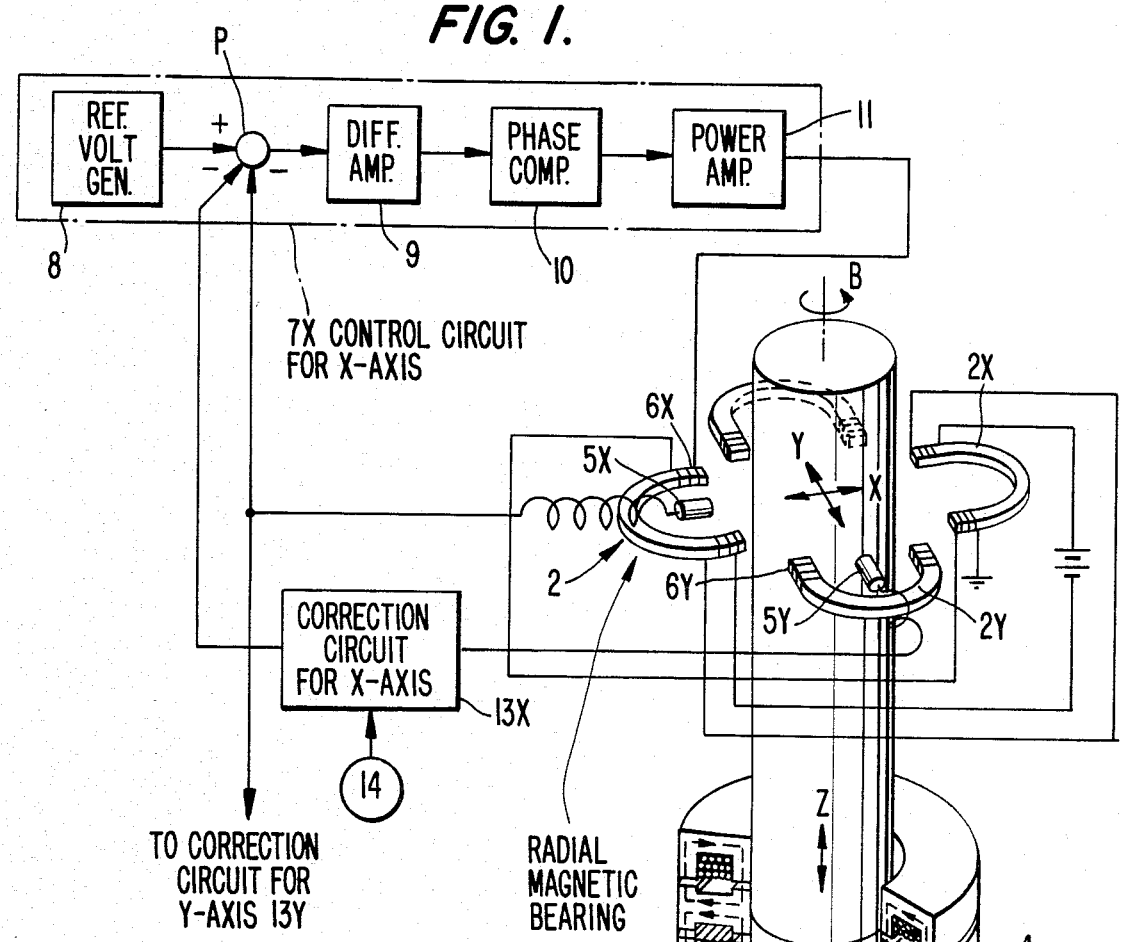
FIG. 1 is a perspective view of an embodiment of controlled radial magnetic bearing device according to the present invention, showing the control system in the form of a block diagram.

Referring to FIG. 1, a rotary shaft 1 is rotated by a motor 3 in a direction of arrow B, supported in a radial direction by a radial magnetic bearing 2 having electromagnets 2X for X-axis and electromagnets 2Y for Y-axis disposed on an X-axis and a Y-axis, respectively, perpendicular to each other in a plane at right angles to the axis of the rotary shaft 1. Numeral 4 designates a thrust magnetic bearing for suppressing any displacement of the rotary shaft 1 in an axial direction Z. Two or more radial magnetic bearings 2 are usually provided at suitable positions in an axial direction e.g. near the ends of thr rotary shaft.

On the X-axis and Y-axis in the plane in which the magnetic bearing 2 is disposed, a position sensor 5X for X-axis and a position sensor 5Y for Y-axis are arranged, respectively. They detect any displacement of the rotary shaft with respect to a reference position in the X-axis and Y-axis directions, respectively, and generate the outputs depending on the amounts of displacement. The electromagnets 2X and 2Y have control windings 6X, 6Y, respectively, for adjusting their magnetic forces. The exciting currents for these control windings are controlled by a control circuit 7X for the X-axis and a control circuit 7Y for the Y-axis, respectively.

The control circuit 7X for the X-axis comprises a reference voltage generating circuit 8 for supplying a predetermined reference voltage indicative of a reference position of the rotary shaft in the X-axis direction, a difference amplifier 9 for amplifying the difference between the output of the position sensor 5X and the reference voltage, a phase compensating circuit 10 for compensating any phase delay of the control system, and a power amplifier 11 for amplifying the output of the phase compensating circuit 10 to a level suitable for the excitation of the control winding 6X. The output of the position sensor 5X is fed back to a point P disposed between the reference voltage generating circuit 8 and the difference amplifier 9 for comparison with the reference voltage.

In order to suppress the rotary shaft 1 from precession in a reverse direction (shown in FIG. 2 by arrow C), the output of the position sensor 5Y for Y-axis with phase advanced by 90 degrees in the direction of reverse precession is supplied to the point P in the control circuit 7X for the X-axis. The above said output is supplied by adding to the output of the position sensor 5X after decreasing it at a suitable ratio by means of a correction circuit 13 for the X-axis and deleting the output not within the frequency band of precession by a band-pass filter. The abovementioned ratio increases with the output of a speed detector 14 (described later) for detecting the speed of rotation of the rotary shaft 1, such as a pulse generator and a tachometer generator. The rate of increase does not necessarily have to be linear, but should preferably be high in the low-speed range and low in the high-speed range. In other words, the rate of increase should preferably decrease continuously or stepwise with an increase in the speed of rotation.

Figure 2:
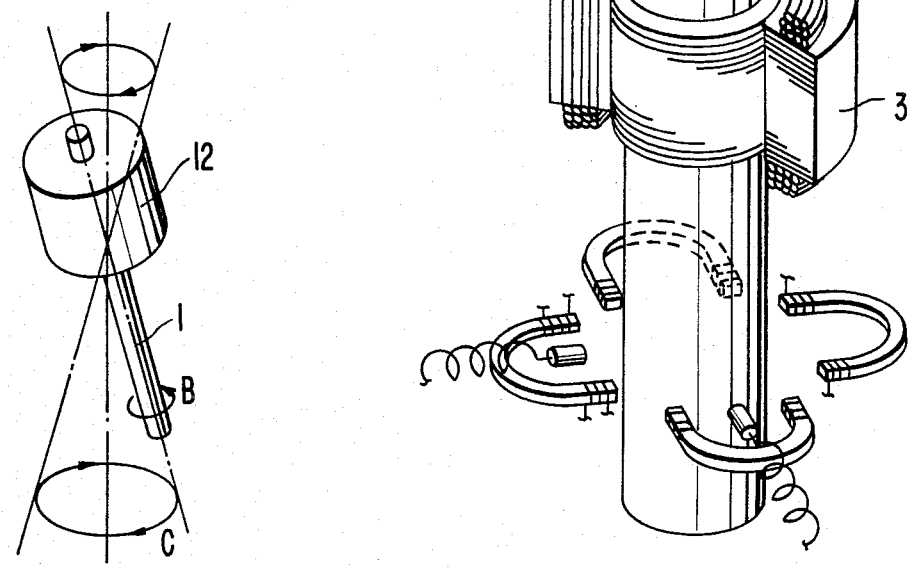
FIG. 2 is an explanatory perspective view showing reverse precession of a rotary shaft of a prior art system.

Numeral 12 in FIG. 2 designates a fin rotor mounted on the rotary shaft 1. The electromagnet 2Y for the Y-axis, too, is provided with a control circuit and a correction circuit having substantially the same structure as those for the X-axis.

Referring to FIG. 3, the output of a rotation speed detector 14, which comprises a pulse generator 15 and a frequency-voltage (FV) converter 16 which detects to detect the speed of rotation of the rotary shaft 1, is connected through a first comparator 17 and a second comparator 18 (described below) to the correction circuit 13X for X-axis. The circuit 13X comprises a band-pass filter (BPF) for the X-axis 19X for removing from the output of the position sensor 5Y for the Y-axis the direct current component and the component beyond several tens of hertz, an analog switch circuit for the X-axis 20X for changing the output of the band-pass filter 19X according to the logic output of either the first comparator 17 or the second comparator 18, and an adder 21X for the X-axis which adds the output of the position sensor 5X for the X-axis and the output of the analog switch circuit 20X and feeds the result of addition back to the control circuit 7X for the X-axis. The first comparator 17 and the second comparator 18 have a logic output which changes when the output of the speed detector 14 becomes equal to a preset voltage corresponding to a certain speed, e.g. 6000 rpm (or 15,000 rpm).

Similarly, a correction circuit for Y-axis 13Y comprises a band-pass filter (BPF) 19Y for the Y-axis, an analog switch circuit 20Y for the Y-axis, the output of which changes according to the logic output of the first comparator 17 and the second comparator 18, and an adder 21Y. However, it differs slightly from the correction circuit for the X-axis 13X in that the output of the position sensor for the X-axis 5X is inputted to the band-pass filter for Y-axis 19Y not directly but after being phase-reversed by a reversing circuit 22. This is because viewing in the direction of reverse precession of the rotary shaft 1 (see FIGS. 1 and 2), the phase of the reverse precession detected by the position sensor for the X-axis 5X lags by 90 degrees with respect to the reverse precession detected by the position sensor for Y-axis 5Y, and thus the output of the position sensor 5X has to be added to the output of the position sensor 5Y on the assumption that it leads by 90 degrees with respect to the output of the position sensor 5Y. In case the output of position sensor 5X leads in phase by 90 degrees with respect to the output of position sensor 5Y, the reversing circuit 22 should be connected between the position sensor 5Y and the band-pass filter for the X-axis 19X.

The outputs of the control circuit for the X-axis 7X and the control circuit for the Y-axis 7Y are connected to the control winding 6X of the electromagnet for X-axis 2X and the control winding 6Y of the electromagnet for the Y-axis 2Y, respectively. If the DC component of the electromagnet is small while the magnetic bearing is being controlled, the band-pass filter may be replaced by a low-pass filter.

Next, it will be described how the precession of the rotary shaft 1 is attenuated in the preferred embodiment. Let us assume that the rotary shaft 1 is now in reverse precession with an amplitude A in the direction shown in FIGS. 1 and 2. Looking at only frequency component of the reverse precession, the outputs of the position sensor for the X-axis 5X and the position sensor for the Y-axis 5Y can be represented as follows:

$$X = A \cos \omega t$$

$$Y = A \cos(\omega t + 90°) = -A \sin \omega t$$

wherein $\omega$ is the angular frequency of precession.

If the outputs of the position sensors 5X and 5Y are gain-adjusted to the original amplitude multiplied by k times after having passed through the band-pass filters 19X and 19Y and the analog switch circuits 20X and 20Y, respectively, these outputs after the gain adjustment are represented as follows:

$$X' = kA \cos \omega t$$

$$Y' = -kA \sin \omega t$$

Thus, the control inputs Fx and Fy to the control circuits 7X and 7Y for the electromagnets 2X and 2Y (that is, the outputs of the adders 21X and 21Y), respectively, can be represented as follows:

$$Fx = X + Y'$$
$$= A \cos \omega t + (-RA \sin \omega t)$$
$$A \sqrt{1 + R^2} \cos(\omega t + \theta)$$

$$Fy = Y - X'$$
$$= -A \sin \omega t - (kA \cos \omega t)$$
$$= -A \sqrt{1 + R^2} \sin(\omega t + \theta')$$

$$\theta' = \tan^{-1} R = \theta$$

Namely, by adding the component of the output of the position sensor for the Y-axis to the output of the position sensor for the X-axis and adding the component of the output of the position sensor for the X-axis to the output of the position sensor for the Y-axis, a phase lead, $\theta$, can be added to the frequency component of the reverse precession, so that reverse precession will be attenuated.

As described above, with the controlled type radial magnetic bearing device according to the present invention, precession can be effectively controlled without increasing the gain or dynamic rigidity of the control system and thus without causing an increase of vibration. Therefore, it can be widely used as magnetic bearings for spindles of various kinds of industrial machines such as machine tools, turbo-molecular pumps, and turbines for generator.

We claim:

1. A controlled radial magnetic bearing device having an X-axis electromagnet and a X-axis electromagnet provided on an X-axis and Y-axis perpendicular to each other in a plane normal to the axis of a rotary shaft for magnetically supporting the rotary shaft, X-axis and Y-axis position sensors provided on the X-axis and Y-axis for detecting any displacement of the rotary shaft from its reference position in the X-axis and Y-axis direction, respectively, and X-axis and Y-axis control circuits for feeding the outputs of said position sensors back to said electromagnets and thereby controlling the outputs of said electromagnets, further comprising a speed detecting means connected to each of said control circuits for detecting the speed of rotation of the rotary shaft, an X-axis correction circuit comprising a band-pass filter for extracting a reverse precession frequency component from an output of said Y-axis position sensor, said output being out of phase by 90 degrees with respect to said X-axis position, for controlling the position of the rotary shaft in the X-axis direction, a changing means for changing an output of said band-pass filter according to an output of said speed detecting means and an adder means for adding an output of said changing means to an output of said X-axis position sensor, said output leading in phase by 90 degrees from the reverse precession frequency, said X-axis correction circuit supplying its output to said X-axis control circuit, and a X-axis correction circuit comprising a band-pass filter for extracting a reverse precession frequency component from an output of said X-axis position sensor, said output being out of phase by 90 degrees with respect to said Y-axis position, for controlling the position of the rotary shaft in the Y-axis direction, a changing means for changing an output of said band-pass filter according to an output of said speed detecting means and an adder means for adding an output of said changing means to an output of said Y-axis position sensor, said Y-axis correction circuit advancing the phase of the output of said X-axis position sensor by 90 degrees with respect to the output of said Y-axis position sensor.

2. A magnetic bearing device as claimed in claim 1 wherein each of said changing means increases steply the output of said respective band-pass filter according to the range of the speed of rotation detected by said speed detecting means.

3. A magnetic bearing device as claimed in claim 2, wherein each of said changing means comprises an analog switch circuit.

4. A magnetic bearing device as claimed in claim 3, wherein a first comparator means and a second comparator means are provided between said speed detecting means and said analog switch circuits so that their logic output will change when the output of said detecting means becomes equal to a preset voltage corresponding to a predetermined speed, the output of each of said band-pass filters being adapted to change into one of two values according to the logic output of said first or second comparator means.

5. A magnetic bearing device as claimed in claim 1, wherein said speed detecting means comprises a pulse generator and a frequency-voltage converter.

6. A magnetic bearing device as claimed in claim 1, wherein said Y-axis correction circuit has a reversing circuit connected between said X-axis position sensor and its band-pass filter for reversing the phase of the output of said X-axis position sensor so as to supply an output to said band-pass filer which is leading in phase by 90 degrees with respect to the output of said Y-axis position sensor.

* * * * *